(12) United States Patent
Summerfield

(10) Patent No.: US 9,099,085 B2
(45) Date of Patent: Aug. 4, 2015

(54) VOICE AUTHENTICATION SYSTEMS AND METHODS

(75) Inventor: Clive Summerfield, Dickson (AU)

(73) Assignee: Auraya Pty. Ltd., Dickson (AU)

( * ) Notice: Subject to any disclaimer, the term of this patent is extended or adjusted under 35 U.S.C. 154(b) by 979 days.

(21) Appl. No.: 13/056,118

(22) PCT Filed: Jul. 21, 2009

(86) PCT No.: PCT/AU2009/000920
§ 371 (c)(1),
(2), (4) Date: May 27, 2011

(87) PCT Pub. No.: WO2010/009495
PCT Pub. Date: Jan. 28, 2010

(65) Prior Publication Data
US 2011/0224986 A1 Sep. 15, 2011

(30) Foreign Application Priority Data
Jul. 21, 2008 (AU) .................................. 2008903729

(51) Int. Cl.
*G10L 17/12* (2013.01)
(52) U.S. Cl.
CPC ...................................... *G10L 17/12* (2013.01)

(58) Field of Classification Search
USPC .......................................... 704/246–255, 273
See application file for complete search history.

(56) References Cited

U.S. PATENT DOCUMENTS

| | | | |
|---|---|---|---|
| 6,681,205 B1 | 1/2004 | San Martin et al. | |
| 6,804,647 B1 * | 10/2004 | Heck et al. | 704/246 |
| 7,363,223 B2 * | 4/2008 | Chaudhari et al. | 704/246 |
| 7,386,448 B1 | 6/2008 | Poss et al. | |
| 7,404,087 B2 * | 7/2008 | Teunen | 713/186 |
| 7,409,343 B2 * | 8/2008 | Charlet | 704/246 |
| 2004/0162726 A1 | 8/2004 | Chang | |
| 2004/0177097 A1 | 9/2004 | Yu et al. | |
| 2004/0225498 A1 * | 11/2004 | Rifkin | 704/250 |
| 2007/0150745 A1 | 6/2007 | Peirce et al. | |
| 2007/0219801 A1 * | 9/2007 | Sundaram et al. | 704/270 |
| 2008/0091425 A1 | 4/2008 | Kane | |
| 2008/0222722 A1 * | 9/2008 | Navratil et al. | 726/21 |
| 2009/0006093 A1 * | 1/2009 | Das | 704/246 |

* cited by examiner

*Primary Examiner* — Abul Azad
(74) *Attorney, Agent, or Firm* — Price Heneveld LLP (57) ABSTRACT

A method for configuring a voice authentication system employing at least one authentication engine comprises utilizing the at least one authentication engine to systematically compare a plurality of impostor voice sample against a voice sample of a legitimate person to derive respective authentication scores. The resultant authentication scores are analyzed to determine a measure of confidence for the voice authentication system.

24 Claims, 9 Drawing Sheets

VOICE AUTHENTICATION SYSTEMS AND METHODS

This application is a US National Phase application based on International Application No. PCT/AU2009/000920, filed internationally on 21 Jul. 2009, which in turn claims priority to and benefit from Australian Application No. 2008903729 filed Jul. 21, 2008 entitled "VOICE AUTHENTICATION SYSTEMS AND METHODS", the entire disclosure of which is incorporated herein by reference.

FIELD OF THE INVENTION

The present invention relates generally to a voice authentication system and methods.

BACKGROUND OF THE INVENTION

Voice authentication systems are becoming increasingly popular for providing access control. For example, voice authentication systems are currently being utilised in telephone banking systems, automated proof of identity applications in call centres systems, automatic teller machines, building and office entry access systems, automated password reset, call back verification for highly secure internet transactions, etc.

Voice authentication is typically conducted over a telecommunications network, as a two stage process. The first stage, referred to as the enrollment stage, involves processing a sample of a person's voice presented to a voice authentication engine to generate an acoustic model or "voiceprint" that represents their unique voice characteristics. The second stage, or authentication stage, involves receiving a voice sample of a person to be authenticated (or identified) over the network. Again, the voice authentication engine generates an acoustic model of the sample and compares this with the stored voiceprint to derive an authentication score indicating how closely matches the two samples are (and therefore the likelihood that the person is, in fact, the same as that being claimed). This score is typically expressed as a numerical value and involves various mathematical calculations that can vary from engine to engine.

In the case of the correct, or "legitimate", person accessing the authentication system, the expectation is that their voiceprint will closely match the voiceprint previously created for that person, resulting in a high score. If a fraudster (often referred to in the art as an "impostor") is attempting to access the system using the legitimate person's information (e.g. speaking their account number and password, for example), the expectation is that the impostor's voiceprint will not closely match the legitimate person's voiceprint, thus resulting in a low score even though the impostor is quoting the correct information.

Whether a person is subsequently deemed to be legitimate is typically dependent on the threshold set by the authentication system. To be granted access to the system, the score generated by the authentication system needs to exceed the threshold. If the threshold score is set too high then there is a risk of rejecting large numbers of legitimate persons. This is known as the false rejection rate (FRR). On the other hand, if the threshold is set too low there is a greater risk of allowing access to impostors. This is known as the false acceptance rate (FAR).

As one would appreciate therefore, selecting an appropriate threshold for an authentication system can be difficult to achieve. On one hand the threshold setting needs to be high enough that business security requirements of the secure services utilising the authentication system are met. However, such settings can cause undue service issues with too many legitimate persons being rejected. Similarly, if the threshold is set too low, while achieving good services levels, security may be put at risk. The problem of selecting appropriate threshold settings is compounded by the fact that different authentication engines utilise different attributes or characteristics for voiceprint comparison and as a result may produce a wide range of different scores based on the same type of content provided in the voice samples (e.g. numbers, phrases, etc.). What is more a single engine will also produce quite different scores for voice samples of different content types, for example an account number compared to a date of birth, or a phrase.

DEFINITIONS

"Voice Sample" is used herein to denote a sample of a person's voice.

"Voice file" is the storage of a voice sample as a data file.

"Voiceprint" is an acoustic model of a person's voice characteristics (i.e. an acoustic model). Voiceprints are generated from voice samples/files and may be processed by a voice authentication engine to generate probability scores as to how closely the characteristics of an associated speaker match those of another speaker.

"Content Type"—refers to the type of content being provided in the voice sample. For example, the content type may be a spoken account number or password. Other content types can include but are not limited to an answer to a question; an unconstrained passage of speech as spoken by a caller to a call centre agent; or a standard phrase (e.g. "At ABC bank, my voice is my password").

"Impostor" is used herein to refer to a person that is known to the system but is not the "legitimate speaker". The term "impostor" is also used as a technical term used in this document to describe the behaviour of a fraudster or an identity thief that is using a legitimate speaker's content information (e.g. spoken account number and password) in an attempt to gain access to that person's secure services.

"Threshold" refers to a base setting against which the authentication scores are compared for determining whether to accept or reject that speakers claimed identity. If the score exceeds the threshold, the person will typically be accepted. If the score is below the threshold, the authentication system typically rejects the person. Multiple thresholds may be utilised associated with different levels of assurance.

"Business Rule" is used herein to refer to one or more risk parameters determined by a secure service associated with allowing customers access to different secure services. For example, a business rule may stipulate that a user only has to receive a moderate authentication score in order to gain access to their account for performing standard transactions (e.g. to pay their electricity bill), but would need to be authenticated to a much higher level of certainty (i.e. produce a high authentication score) to perform high cost high risk transactions such as accessing overseas accounts, etc.

SUMMARY OF THE INVENTION

In accordance with a first aspect, the present invention provides a method for configuring a voice authentication system employing at least one authentication engine, the method comprising the steps of:
 (a) utilising the at least one authentication engine to systematically compare a plurality of impostor voice samples against a legitimate speaker voiceprint to derive respective authentication scores;

(b) analysing the resultant authentication scores to determine a measure of confidence for the voice authentication system.

According to such an aspect, the present invention is arranged to affectively analyse how well the system performs against a simulated impostor attack utilising samples provided by other speakers known to the system. The scores may be mapped to a business risk associated with the chance of an impostor gaining access to a secure service and to determine resultant services levels (for example, customer convenience services level requirements) associated with a legitimate speakers.

In an embodiment, method step (a) further comprises generating additional authentication scores (hereafter "legitimate scores") by comparing the legitimate speaker's voiceprint against one or more voice samples provided by the same legitimate speaker. The voice samples may, for example, be provided during enrollment or during a previous successful authentication session.

In an embodiment an authentication score is output for each engine and wherein the measure is determined based on the resultant scores for each engine and for each comparison.

In an embodiment the method further comprises setting business rules for an associated secure service based on the measure of confidence.

In an embodiment the business rules comprise assigning one or more different thresholds to transactions having varying security requirements.

In an embodiment step (a) is systematically repeated for voiceprints of other legitimate speakers known to the authentication system and the resultant scores are analysed to determine the measure of confidence.

In an embodiment step (a) is repeated for samples having a different content type to the voice sample from which the legitimate speaker voiceprint was derived. For example, the imposter sample content type may be numerical (e.g. the imposter may be quoting a pin number) whereas the content type of the legitimate sample may be a phrase (e.g. the legitimate speaker quoting a password).

In an embodiment the method further comprises plotting the resultant scores on a space or graph (referred to herein as an "Impostor Map™") and determining the measure of confidence based on at least one of the grouping and location of resultant scores within the space/graph.

In an embodiment the grouping and/or location between the scores resulting from the impostor testing and legitimate sample testing are analysed to determine the measure of confidence.

In an embodiment the space comprises "m"דn" dimensions, where "m" represents the number of authentication engines and "n" represents a number of different imposter sample content types used for comparison.

In an embodiment the impostor voice sample comprises segmented speech elements from at least one sample of a speaker other than the legitimate speaker which are ordered in such a way so as to provide the same content spoken in the legitimate voice sample from which the voiceprint was derived. Such an embodiment may be useful where none of the impostor voice samples on their own contain the required content (e.g. identification information, such as the legitimate speaker speaking their name) for the comparison. The segmentation and re-grouping may be performed by a speech recognition system working together with the authentication engine.

In an embodiment the legitimate voice sample is a sample provided by the legitimate speaker in a previous successful authentication process.

In an embodiment the impostor voice sample is generated from samples provided by other legitimate speakers during enrollment with the system.

In an embodiment the impostor voice sample is generated from samples provided by other legitimate speakers in previous successful authentication processes.

In an embodiment the voice sample from which the legitimate speaker voiceprint was derived and impostor voice sample share a common speaker characteristic. For example, the common speaker characteristic may be gender.

In accordance with a second aspect the present invention provides a method for configuring a voice authentication system employing at least one authentication engine, the method comprising the steps of:

(a) utilising the at least one authentication engine to compare one or more impostor voice samples against each of a plurality of legitimate speaker voiceprints to derive authentication scores for each comparison; and (b) analysing the resultant scores to determine a measure of confidence for the voice authentication system.

In an embodiment, method step (a) further comprises generating additional authentication scores by comparing each of the legitimate speaker's voiceprints against one or more voice samples provided by the same legitimate speaker.

In an embodiment an authentication score is output for each engine and wherein the measure is determined based on the resultant scores.

In an embodiment the method further comprises plotting the resultant scores on a graph and determining the measure of confidence based on at least one of the grouping and location of resultant scores within the graph.

In an embodiment the grouping and/or location between the scores resulting from the impostor testing and legitimate sample testing are analysed to determine the measure of confidence.

In an embodiment the space is a graph comprising "m"× "n" dimensions, where "m" represents the number of authentication engines and "n" represents a number of different imposter sample content types used for comparison. In an embodiment, different graphs are generated for different voiceprints. Alternatively, the same graph may be used to plot results for combined voiceprint scores.

In an embodiment, the imposter voice samples have alternative content types to the samples from which the legitimate person voice-prints were derived.

In accordance with a third aspect the present invention provides a method for configuring a voice authentication system, the method comprising the steps of:

(a) utilising an authentication engine to compare at least one imposter voice sample against a voiceprint of a legitimate speaker and outputting an authentication score for each comparison;

(b) repeating step (a) for at least one other authentication engine; and (c) determining which authentication engine to utilise based on the resultant scores for each engine.

In an embodiment the imposter voice samples have the same content type to the samples from which the legitimate speaker voice-prints were derived.

In an embodiment step (b) is repeated using imposter voice samples that have an alternative content type to the samples from which the legitimate speaker voice-prints were derived.

In accordance with a fourth aspect the present invention provides a system for configuring a voice authentication system comprising:

at least one authentication engine operable to systematically compare a plurality of one impostor voice samples against a voiceprint of a legitimate speaker to derive respective authentication scores; and an analysis module operable to analyse the resultant authentication scores to determine a measure of confidence for the voice authentication system.

In an embodiment, the at least one authentication engine is further arranged to derive additional authentication scores by comparing the legitimate speaker's voiceprint against one or more voice samples provided by the same legitimate speaker.

In an embodiment an authentication score is output for each engine and wherein the measure is determined based on the resultant scores.

In an embodiment the analysis module is further arranged to set business rules for an associated secure service based on the measure of confidence.

In an embodiment the business rules comprise assigning one or more different thresholds to transactions having varying security requirements.

In an embodiment the authentication engine is further arranged to systematically repeat the comparison for voiceprints of other legitimate speakers known to the authentication system and the resultant scores are analysed by the analysis module to determine the measure of confidence.

In an embodiment the analysis module is arranged to plot the resultant scores on a graph and determining the measure of confidence based on at least one of the grouping and location of resultant scores within the graph.

In an embodiment the grouping and/or location between the scores resulting from the impostor testing and legitimate sample testing are analysed to determine the measure of confidence.

In an embodiment the space is a graph comprising "m"× "n" dimensions, where "m" represents the number of authentication engines and "n" represents a number of different impostor sample content types used for comparison.

In an embodiment the impostor voice sample comprises segmented speech elements from at least one sample of a speaker other than the legitimate speaker which are ordered in such a way so as to provide the same content spoken in the legitimate voice sample from which the voiceprint was derived. In an embodiment the system further comprises a speech recognition module arranged to re-order the samples to produce the impostor samples.

In accordance with a sixth aspect the present invention provides a system for configuring a voice authentication system comprising:

at least one authentication engine operable to compare one or more impostor voice samples against each of a plurality of legitimate speaker voiceprints to derive authentication scores for each comparison; and an analysis module operable to analyse the resultant scores to determine a measure of confidence for the voice authentication system.

In accordance with a seventh aspect the present invention provides a method for measuring the vulnerability of an authentication system comprising the steps:

comparing a voice sample of at least one impostor against a legitimate speaker's voiceprint;

based on the comparison, generating a score as to the likelihood that the at least one impostor is the same as the legitimate speaker; and utilising the score to determine a measure of vulnerability associated with the legitimate speaker's voice sample.

In an embodiment, responsive to determining that the score is below a threshold, carrying out the further step of facilitating replacement of a legitimate voice sample from which the voiceprint was derived with a replacement sample. The legitimate speaker's voiceprint may then be regenerated based on the replacement sample.

In an embodiment responsive to determining that the score is below a threshold, carrying out the further step of adjusting an attribute of the system to increase a level of authentication for the legitimate speaker.

In an embodiment the attribute is associated with one or more business rules that determine whether access is granted to a secure service associated with the legitimate speaker.

In an embodiment the method comprises the further step of adjusting an authentication threshold limit of the system depending on an equal error rate of the authentication system.

In an embodiment the at least one impostor voice sample comprises individual speech elements taken from other speakers known to the authentication system.

In an embodiment both the impostor voice sample and legitimate voice sample comprise the same spoken content.

In an embodiment the impostor sample is generated from samples provided by other legitimate speakers during enrollment with the system.

In an embodiment the impostor sample is generated from samples provided by other legitimate speakers in a successful authentication process.

In the context of the specification the term "voice characteristic" will be understood to encompass any "voiced" or "unvoiced" sound characteristic of a person/speaker resulting from either the vibration of the vocal folds at the base of the person's throat or produced as a result of turbulent airflow caused by a constriction in the person's vocal track when uttering a word (e.g. the hissing noise made in the "s" sound caused by a constriction formed by the tip of the tongue against the alveolar ridge at the back of the top teeth). The "unvoiced" sounds may be modified by the time varying acoustic transfer characteristic of the vocal tract which are mostly defined by the dimensions of the vocal tract and the position of the tongue, the lips and the velum (the flap of skin at the back of the throat that governs access to the nasal cavity). Working in harmony, the sound sources (i.e. voiced and unvoiced sounds) either operating alone or in combination are filtered and modified by the time varying acoustic transfer characteristic of the vocal tract to produce a sound pressure wave emanating from the lips and nostrils that humans perceive as speech.

In accordance with an eighth aspect the present invention provides a computer program comprising at least one instruction for controlling a computing system to implement a method in accordance with the first, second, third or seventh aspects.

In accordance with a ninth aspect the present invention provides a computer readable medium providing a computer program in accordance with the eighth aspect.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

For the purposes of illustration, and with reference to the figures, embodiments of the invention will hereafter be described in the context of a voice authentication system for a secure service, such as a secure interactive voice response ("IVR") telephone banking service. In the illustrated embodiment, the authentication system is implemented as a third party system independent of the secure service. It will be understood by persons skilled in the art, however, that both the secure service and authentication system may be integrated as a single service. Persons (hereafter "customers") communicate with the authentication system using an input device in the form of a fixed telephone (although it will be understood that a mobile telephone, VOIP PC-based telephone, or the like may equally be utilised for communicating with the authentication system).

Figure 1:
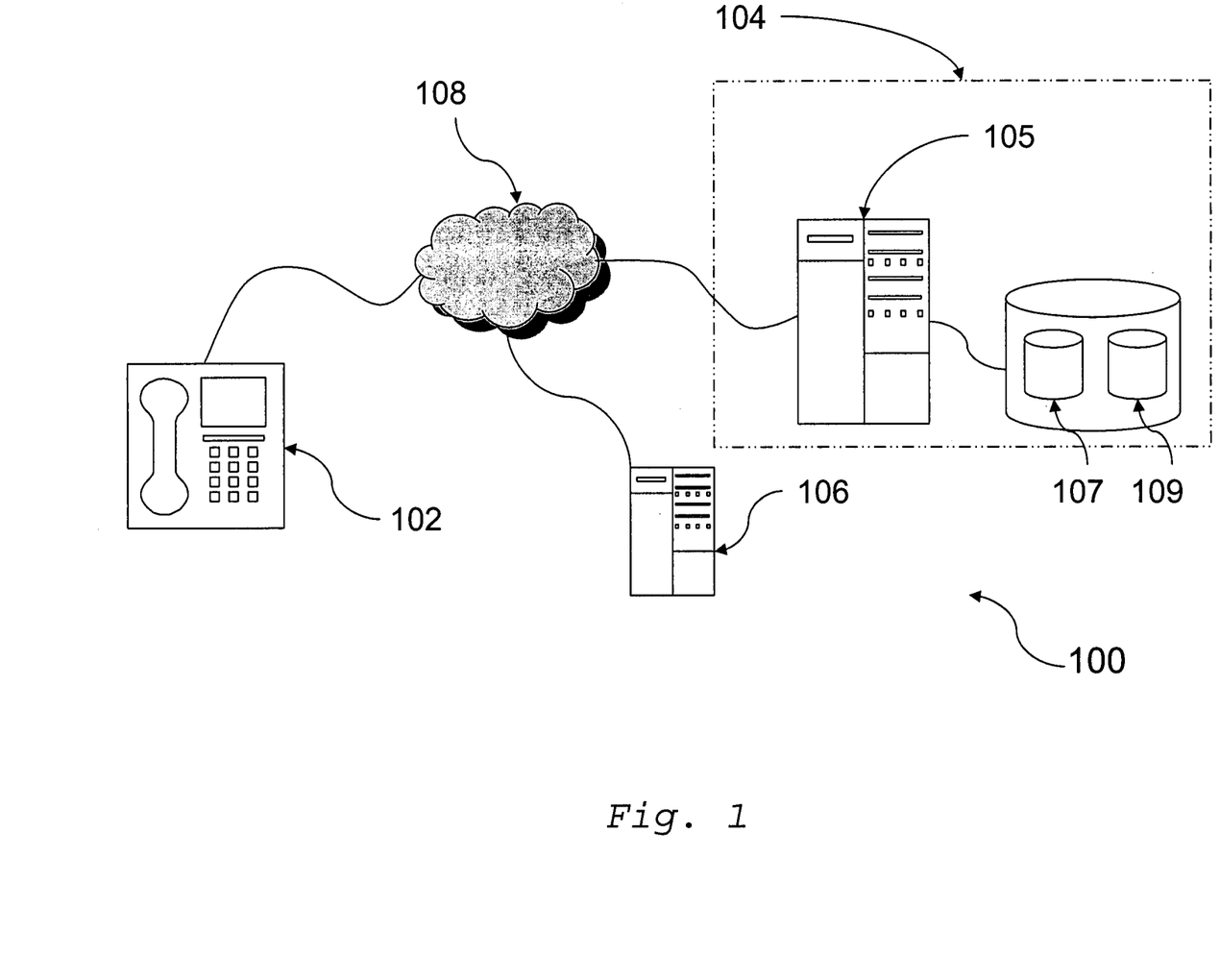
FIG. 1 is a block diagram of a system in accordance with an embodiment of the present invention.

FIG. 1 illustrates an example system configuration 100 for implementing an embodiment of the present invention. The system 100 includes a user input device 102 in the form of a standard telephone; third party authentication system 104 (hereafter "third party system"); secure service provider system 106 in the form of an Internet banking server hosting a secure customer banking web site; and communications system 108 in the form of a public-switched telephone network.

Figure 2:
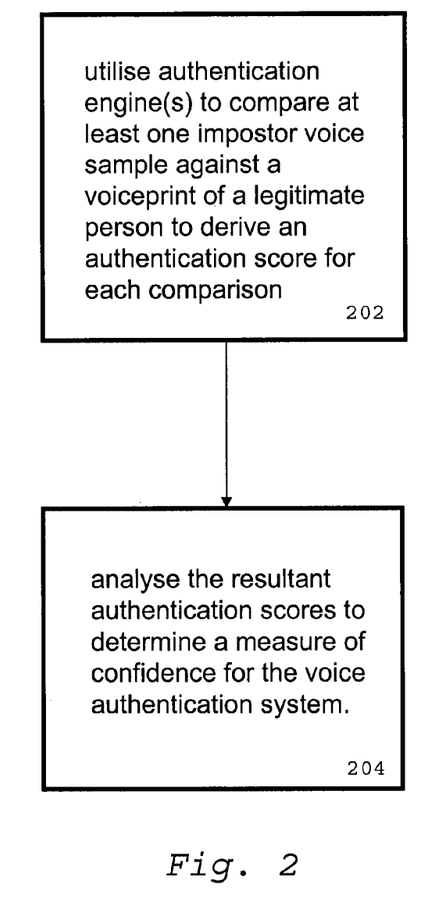
FIG. 2 is a basic process flow for carrying out an embodiment of the present invention.

With reference to FIG. 2 there is shown a flowchart illustrating method steps for implementing an embodiment. Embodiments are operable to determine and subsequently improve the robustness of the authentication system 100 by systematically attempting to impostor stored voiceprints by comparing voice samples of other known customers against the stored voiceprints (step 202). The resultant scores are then used to determine confidence measures associated with the system (step 204) and identify any "weak" voiceprints which may have an increased susceptibility to a real impostor attack. Action may be taken to increase the robustness of the system around those weak voiceprints (e.g. replace the voiceprints or adjust elements of the authentication system).

The following description will first describe an example process for "enrolling" (i.e. initially storing voice samples with the system) and then go on to describe embodiments for determining the confidence measures, implementing business rules and identifying weak voiceprints.

Initial Enrollment

Figure 3:
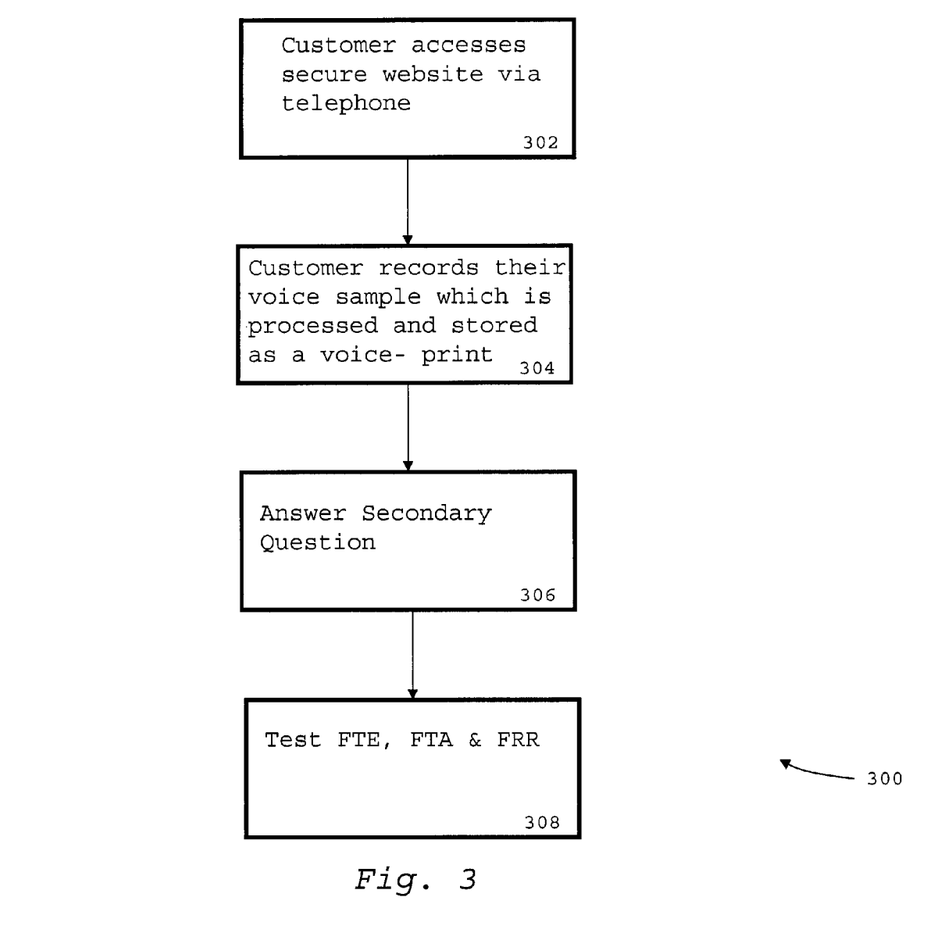
FIG. 3 is a flow diagram showing the method steps for enrolling, in accordance with an embodiment of the invention.

With additional reference to FIG. 3, at step 302 a customer dials a telephone banking number associated with the secure service 106. The third party system 104 answers the call and enrollment begins. This may involve requesting that the customer utter a type of information (i.e. content type) such as their customer number and password.

The customer's voice sample is subsequently processed to produce a voiceprint which is stored in the voiceprint database 107 coupled to the third party system 104 (step 304). The voiceprint is stored in association with a customer identifier, in this case their customer number recorded on the identity management database 111. In an embodiment, at step 306, the customer may also be asked answer to a shared secret question or a standard phrase (such "At ABC bank, my voice is my password"). These phrases are used to strengthen security by providing additional authentication samples on which to base an authentication decision. The phrases may also be used for generating impostor voiceprints, as will be described in more detail in subsequent paragraphs.

After the customer voiceprint(s) have been successfully stored, the third party system 104 may test both the failure to enrol (FTE) and failure to acquire (FTA) characteristics, using techniques known to persons skilled in the art (step 308). These statistics are logged by the third party system 104 and subsequently utilised to determine the false rejection rate (FRR). Specifically this is achieved by shifting the threshold from 0% to 100% and aggregating the percentage of speakers (i.e. customers) in the database that fall below the threshold and therefore would be falsely rejected.

Building Impostor Databases

Figure 1A:
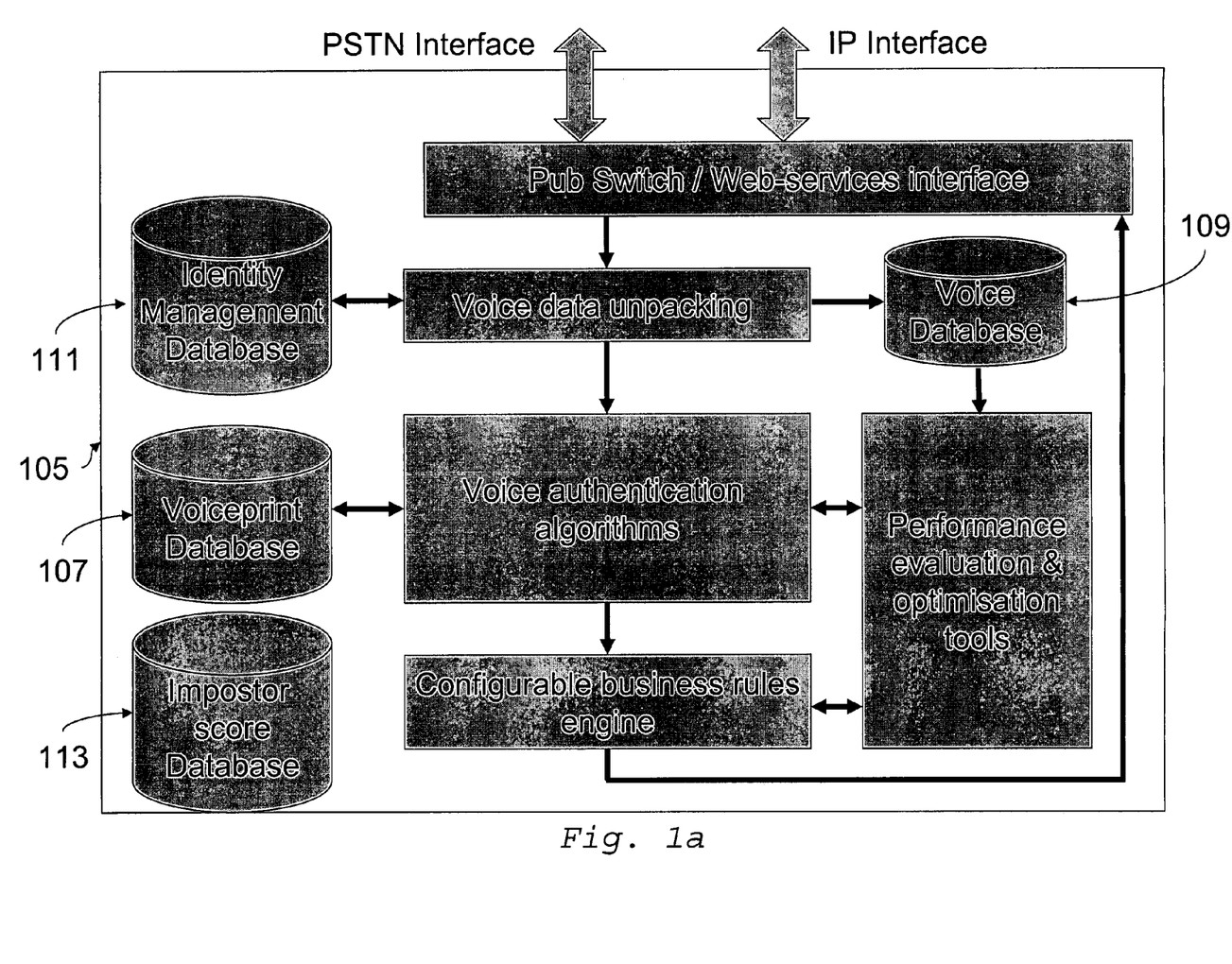
FIG. 1a is a schematic of the individual modules implemented by the third party server of FIG. 1.

With additional reference to FIG. 1a, the authentication system 100 includes an impostor database 109 which stores voice files that are to be utilised in the simulated impostor attacks. In one embodiment, the impostor database 109 comprises voice files of customers who have previously been successfully authenticated by the authentication system (and thus known to the system). In other words, they are voice files of customers that have produced high authentication scores in a previous authentication session and are, therefore, assumed to be legitimate speakers.

In an embodiment, in order to create "impostor" voice files, the voice files stored by the database 109 are processed (e.g. segmenting and re-ordering) to generate the requisite content information for the customer file being tested (i.e. the "legitimate" voice file). Alternatively, where a standard phrase is used for authentication, since the content is the same for all voice samples, the voice files can be used directly as impostor voice files. This is also the case for "text-independent" voice authentication engines which do not use the information component in the voice samples for authentication. However, the process can be applied to model true impostor behaviour, by creating samples with the same information content.

The impostor database 109 is arranged to store as many voice files as required to produce adequate coverage across the authentication system (i.e. to accurately reflect impostor scores and thus ensure an accurate "impostor map", as will be described in more detail in subsequent paragraphs). Furthermore, the process of storing voice files in the impostor database 109 may be on-going; that is, new voice samples presented for authentication can be selected (based on the score generated) and stored in the database for subsequent use in the impostor attacks.

In an embodiment the voice files stored in the impostor database 109 are categorised according to a content type and/or speaker characteristic (e.g. voice item, gender, age group, accent and other linguistic attributes, or some other specified category) determined from information provided during enrollment. In an embodiment, only impostor files that share a selected content type and/or characteristic may be selected for comparison increasing the efficiency and accuracy of the results. For example, where the voiceprint under test is associated with a male speaker speaking account numbers, only male voice files saying account numbers will be utilised for generating impostor files.

Simulating Impostor Attacks

Figure 4A:
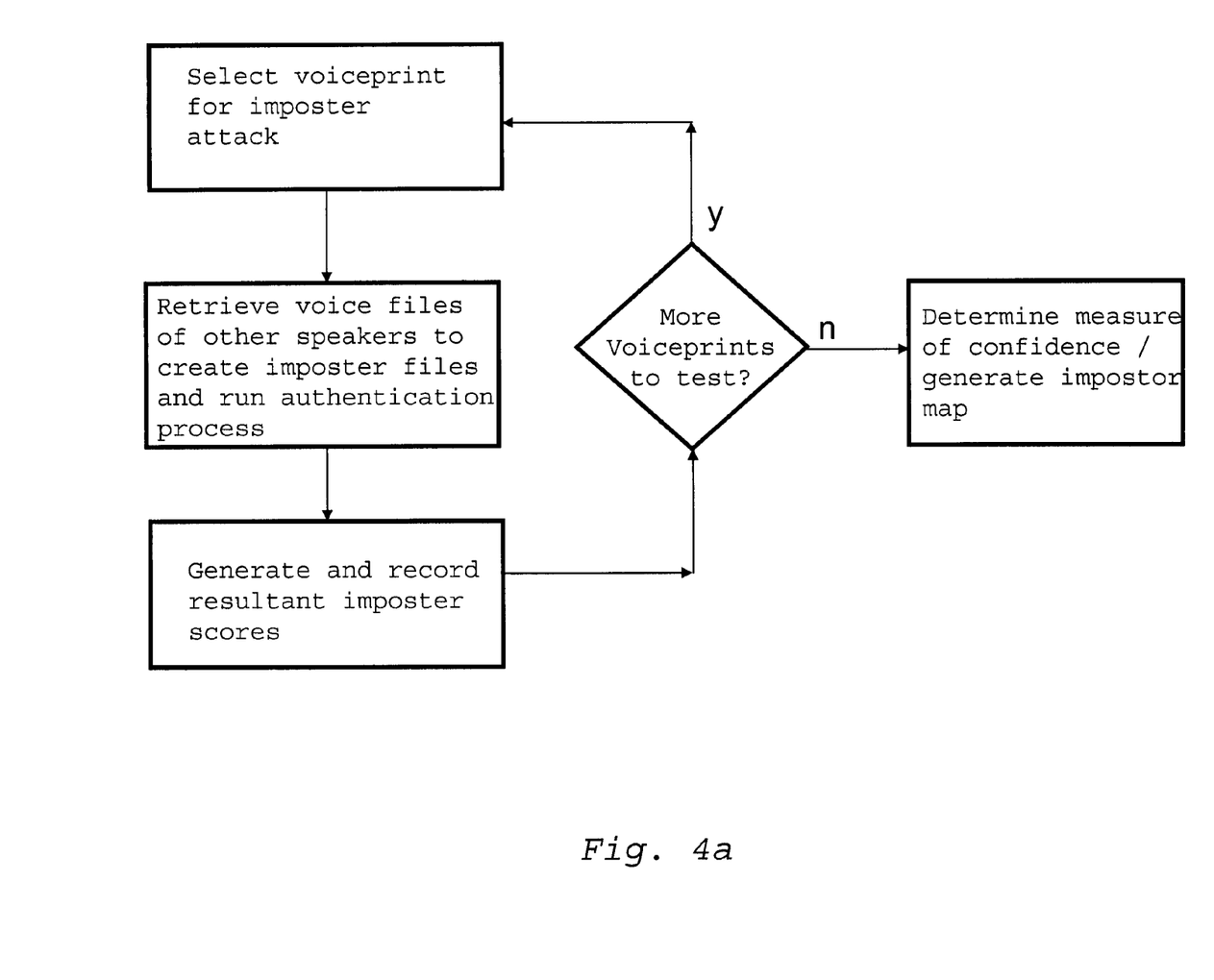
FIG. 4a is a flow diagram for carrying out impostor attacks.

With reference to FIG. 4a, the simulated impostor attack process begins by selecting a customer voiceprint from the voiceprint database 107 (step 402). At step 404, one or more voice files of other known customers are retrieved from the impostor database 109 and processed, where required, to create impostor voice files.

As mentioned above, one technique for creating an impostor voice file/sample is to segment and re-order parts of the or other customer voice file(s) to create a file having the same content information as was present in the sample from which the target voiceprint (hereafter the "legitimate" voiceprint) was derived. This process may involve, for example, passing the other customer file(s) through a speech recognition engine configured to recognise the constituent parts of the file(s) and segmenting the voice file(s) accordingly. The process then continues by re-ordering the constituent parts to form the same spoken content as way present in the legitimate person's voice sample. For example, if the legitimate voiceprint was derived from a sample comprising constituent parts "4, 2, 1, 5", the speech recognition engine may extract and combine individual ones of those constituent parts from one or more other customer voice files stored in the impostor database 109 to generate the same order of constituent parts, but spoken by one or more different customers. The impostor voice file is then applied to one or more of the voice authentication engines implemented by the third party system 104 and the resultant impostor score generated and stored in an impostor score database 113 (step 406).

The legitimate authentication score (i.e. attained during an earlier authentication process for the legitimate person) may also be recorded in association with the resultant impostor score for reasons which will become evident in subsequent paragraphs. It will be noted that, where the authentication system 100 uses a standard phrase for authentication (e.g. "At ABC bank, my voice is my password"), it is not necessary to perform the segmentation and re-ordering step described above. This also applies to systems using text-independent and domain dependent engines.

The above process is repeated for each voiceprint stored in the voiceprint database 107 and the resultant impostor scores recorded. The system 100 may also be configured to allow repeated or multiple impostor attacks, comparing as many or as few imposter files as required (thus providing a range of different impostor scores for each voiceprint under test). Clearly, the more applied impostor attacks, the greater the accuracy of the results. Similarly, where different types of content have been recorded the other content types may also be tested. For example, in one simulated attack a generic phrase recorded by the legitimate person may be tested, while in a second attack content specific information (e.g. recorded customer number) may be tested.

Determining Confidence Measures

The resultant impostor and optionally legitimate score(s) for each impostor attack are subsequently plotted on a graph referred to herein as a so-called "impostor map", with each score represented as a "vector" in a "speaker space". The speaker space comprises "m×n" dimensions; where "n" is the number of different content types applied in the test and "m" is the number of different voice authentication engines used to make each of the comparisons.

Figure 4B:
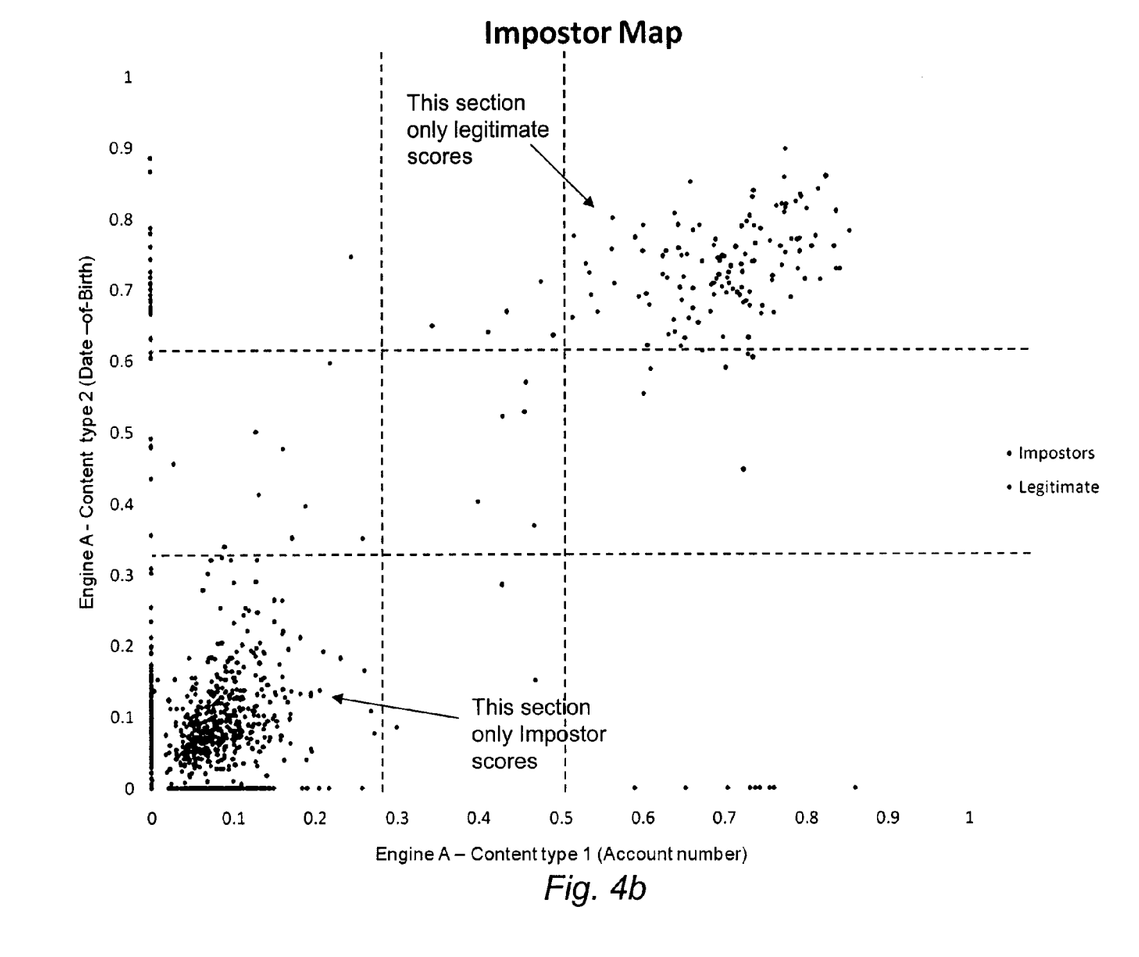
FIG. 4b is a screen shot of an impostor map plotting scores generated from a single authentication engine processing a multiplicity of voice samples having different content types.

An example of an impostor map whereby a single authentication engine "A" is being utilised to test two content types for each impostor comparison is shown in FIG. 4b. The two content types tested in FIG. 4b are date of birth and account number. As is evident from the graph, the majority of impostor scores are clustered in the bottom left hand quadrant, whereas the legitimate scores are more spread out in the top right hand quadrant.

Where a single authentication engine is being utilised, the maps can provide a useful tool for setting appropriate authentication threshold settings based on the content types that may be used for authentication. For example, as illustrated in FIG. 4b, by analysing the sections of the map that contain only impostor scores (i.e. generated through the impostor testing), legitimate scores (i.e. generated, for example, based on applying a legitimate person's voice file against its corresponding stored voiceprint—e.g. which may have been determined and stored from a previous successful authentication action) or a mixture of the two, the system is able to derive a measure of confidence for the system and use the measure set thresholds that it can be confident will provide sufficient authentication with maximum efficiency.

Figure 4C:
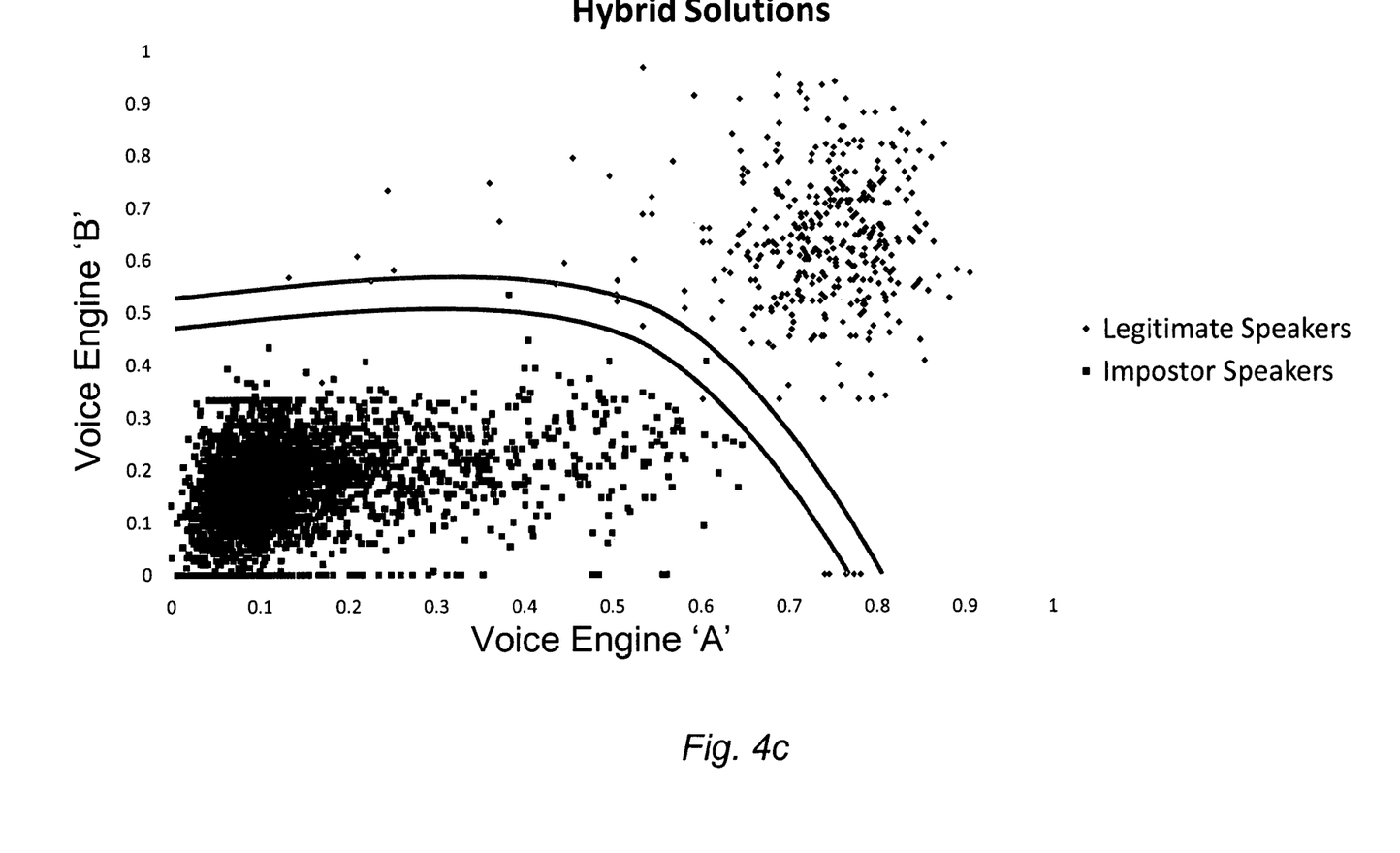
FIG. 4c is a screen shot of two dimensions of a four dimensional impostor map plotting scores generated from a multiplicity of authentication engines processing a multiplicity of voice samples having different content types.

An example impostor map for a system employing two engines "A" and "B" (with each engine being used to test two different content types for each impostor comparison) is shown in FIG. 4c.

In more detail, the impostor map can be utilised to calculate an "m×n=p" dimensional impostor probability profile. There are a number of different ways in which the impostor probability profile can be calculated. One is by "integrating" impostors across the "p" dimensional speaker space to produce an impostor probability score across the whole speaker space. This profile provides the reference against which scores generated by an authentication system comprising "n" speech samples and "m" verification engines can be compared and the probability of that score being generated by an impostor (i.e. P(i)). The probability that the speaker is legitimate, P(l), is then computed as:

$$P(l)=1-P(i)$$

An alternative method is to use the "impostor map" to computer the "acoustic distance" between the scores produced by an authentication process and impostor scores generated by the method described above. In this method, the further the acoustic distance between the legitimate authentication score and the impostor score(s), the higher the level of assurance that the customer is indeed a legitimate customer. In such a method, one possible way of computing the acoustic distance can be to measure the Cartesian distance (i.e. Square root sum of the squares) between the co-ordinates of the authentication score produced in "p" dimensional space and the co-ordinates for all impostor scores in the "impostor map".

For any given set of scores, the probability of a customer being an impostor can readily be established using such a process and thus a measure of confidence for the authentication system can be determined. Furthermore, as mentioned above, the measure of confidence can be mapped against a "business risk" associated with authentication transactions carried out by the customer 102. In other words, appropriate business rules can be set based on any number of voice authentication engines using any number of content types to generate an authentication result.

It will be understood that the process may be updated and business rules/settings re-evaluated each time a new sample or batch of samples is added to the impostor database 109. In other words, the voiceprints stored by the system (i.e. upon which the authentication actions are based) can continuously be analysed and either the system reconfigured or voice files replaced (as will be described in more detail in subsequent paragraphs) to ensure that the measure of confidence is maintained. The updating process also advantageously enables the impostor map to be modified and adapted in response to different telecommunications conditions, different noise conditions, voiceprints updated as a result of the authentication processes and changing patterns of use by speakers.

Embodiments advantageously allow a business to evaluate and set optimal business rules based on scores produced from systematic impostor attacks. The impostor attacks provide an accurate impostor probability profile for any particular authentication system employing any number of different authentication engines and based on any number of different voice sample content type used for authentication. That is, impostor maps can be produced for different combinations of voice authentication engines and content types, such that the secure service can select and configure a system that satisfies both its security requirements and its services level requirements.

Furthermore, where systems are required to fulfill a range of different applications with different business requirements, the process allows voice authentication systems to be dynamically configured to meet those different requirements. This feature is particularly advantageous for third party, or hosted, voice authentication systems that provide authentication services for a number of different businesses or applications within those businesses, since they can be appropriately configured for each business application. A business implementing such a third party authentication system can determine which configuration of content types, voice authentication engines and/or business rules to implement based on the resultant impostor scores so as to deliver the optimal security level and service level requirements to customers.

Identifying Weak Voiceprints

Figure 5:
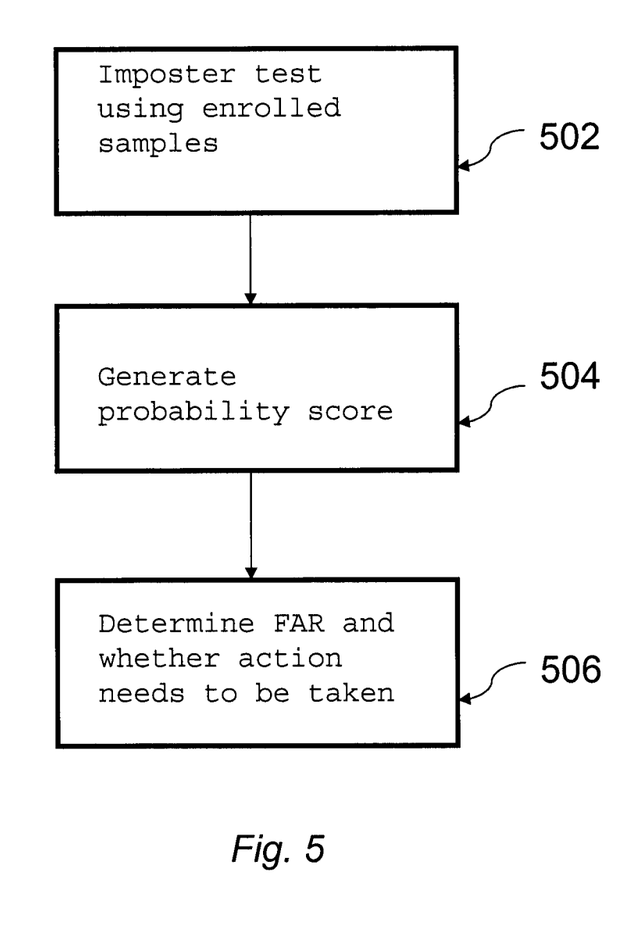
FIG. 5 is a flow diagram of an embodiment for identifying weak voiceprints.

An embodiment for identify weak voiceprints will now be described in more detail with additional reference to FIG. 5.

The first step 502 of the method involves comparing an impostor voice file against a legitimate voiceprint in much the same manner as previously described with reference to FIG. 4. In an embodiment, the impostor voice file may be a voice file provided by the same customer but uttering different content (e.g. quoting the wrong account number), or by testing using the same sample from which the voiceprint was derived (i.e. to simulate a so called "recorder attack" where an impostor submits a copy of the actual voice sample provided by the legitimate customer during enrollment). As can be seen, there are a number of alternative impostor techniques that can utilised for determining weak voiceprints, dependent on the actual implementation required.

At step 504 the authentication engine(s) generate a probability score for the impostor attack (i.e. indicative of the likelihood that the person providing the impostor sample is the legitimate person). As persons skilled in the art will appreciate, the basic process for generating a probability score comprises performing an acoustic analysis of the speech signals present in the impostor sample, and extracting the relevant voice characteristics for statistical analysis and comparison with the voiceprint under test. Algorithms operating in the authentication engines generate verification data in the form of a probability score of a match condition (i.e. an indication of the likelihood that the customer providing both samples is one and the same) based on the statistical analysis. The resultant score then forms the basis to compute the false acceptance rate (FAR); this case shifting the threshold from 100% to 0% and aggregating the percentage of impostors that are above the threshold (i.e. the percentage of impostors that would have been successfully but falsely accepted by the third party system 104).

Figure 6:
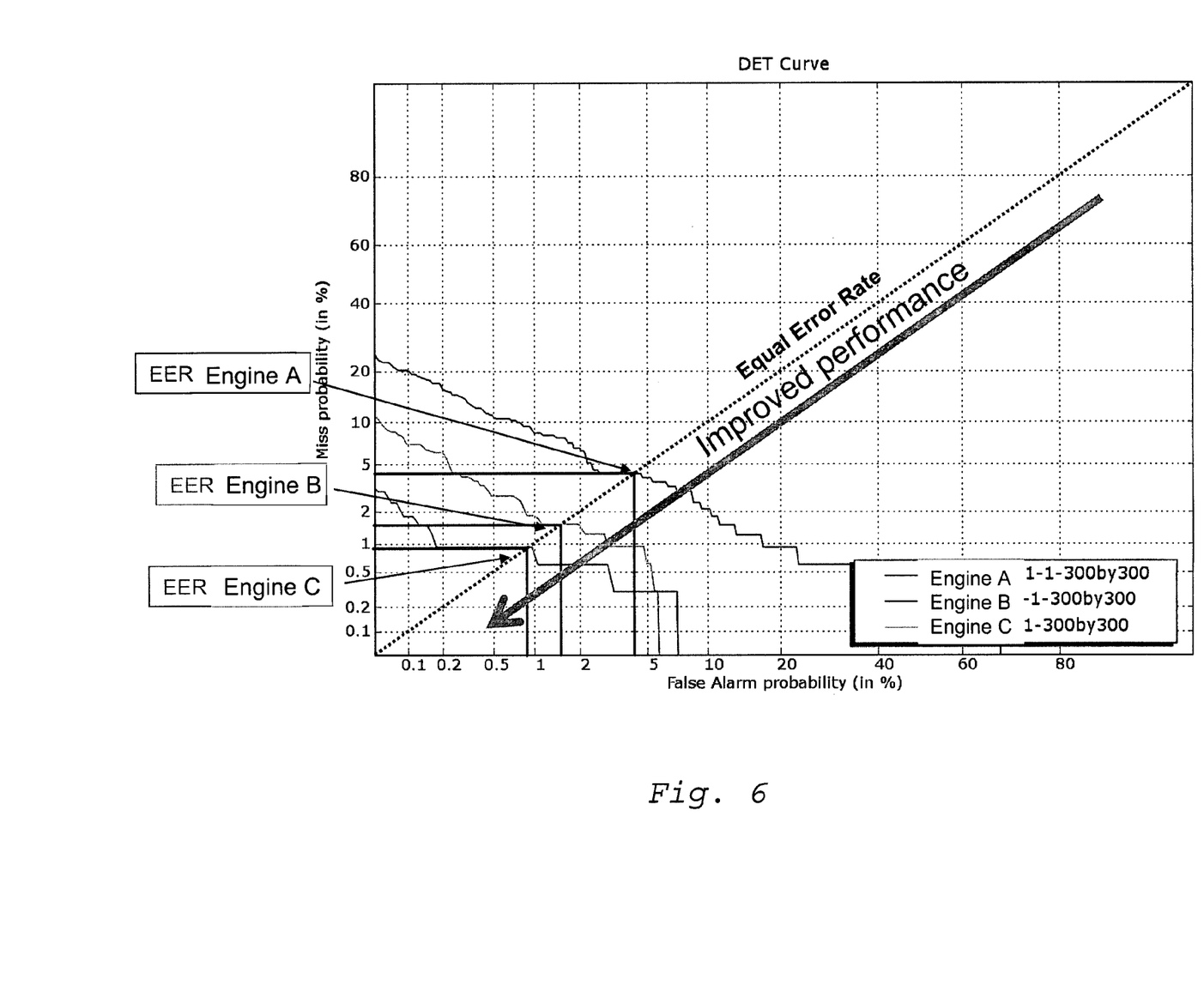
FIG. 6 is a screen shot of a DET curve in accordance with an embodiment.

The FRR and FAR characteristics may be plotted using software residing on the third party server and the ERE of the system determined (i.e. the point where the FRR and FAR curves intersect). Similarly, plotting the FRR against the FAR for each threshold setting will generate a DET curve for the system to emphasis the details at smaller measurements. A screen shot of a DER curve for a given threshold is shown in FIG. 6. Drawing a 45 degree line from the origin to the intersection of the FAR and FER curves will yield the EER for that particular threshold. This process may be repeated for all voice samples stored in the voiceprint database 109. In other words, the above determination is made to provide a baseline indication of the robustness of the third party system 104.

At step 506 the third party system 104 inspects the resultant FAR for each legitimate voiceprint and determines whether any action needs to be taken in order to improve the authentication settings for the associated customer. This may involve, for example, requesting that the customer provide a replacement (i.e. stronger/clearer) sample for storing in the database 107. Alternatively the third party system 104 may increase the threshold level of authentication required to access a secure service associated with that customer. Alternatively the system 104 may require that a further piece of identification information be provided during the authentication process in order to verify the customer's identity to confirm their identity before being granted access to the secure service.

System Configuration

A detailed schematic of the different modules utilised by the third party system 104 is shown in FIG. 1*a*.

As mentioned in preceding paragraphs, the third party system 104 comprises a server 105 which functions to authenticate customers of the secure service and to perform systematic impostor testing, as described in preceding paragraphs. To perform this functionality, the server 105 comprises computer hardware including a processor, motherboard, random access memory, hard disk and a power supply. The server 105 also includes an operating system which co-operates with the hardware to provide an environment in which software applications can be executed. In this regard, the hard disk of the server 105 is loaded with voice authentication software, such as the Auraya voice authentication model which is available from Auraya Systems Pty Ltd, Australia. Specifically, the authentication software employs at least one (although in the illustrated embodiment two authentication engines running in parallel to generate the probability scores are defined). The hard disk is also loaded with an analysis module which operates in conjunction with the voice authentication software to instruct the simulated impostor attacks, determine and analyse the resultant scores (e.g. to calculate the mean distances and groupings for determining confidence measures etc.), and set appropriate thresholds etc, as herein before described. In an embodiment the simulated attacks are run during periods of low traffic or down time (e.g. in the early hours of the morning) to avoid tying up unnecessary processing power. A graphics rendering application is also provided to generate the impostor maps and display representations of the confidence measures.

The server 105 is also coupled to a voiceprint database 107, impostor database 109, identity management database 111 and impostor score database 113. The hard disk of the server 105 also includes appropriate software and hardware for providing an answering service of the secure service provider. The third party system 104 communicates with the customers 102 and secure service provider system 106 over a public-switched telephone network 108 utilising a transceiver module.

The customer input device is a standard telephone including a transceiver and suitable for use with a public-switched telephone network.

As discussed, the communication system 108 is in the form of a public switched telephone network. However, in alternative embodiments the communications network may be a packet-switched network, such as the Internet. In such an embodiment customers may use a networked computing device to exchange data (more particularly, XML code and packetised voice messages) with the server 105 using a packet-switched network protocol, such as the TCP/IP protocol. Further details of such an embodiment are outlined in the published international patent application PCT/AU2008/000070, the contents of which are incorporated herein by reference. In another alternative embodiment, the communication system may additionally comprise a third generation ("3G") or GPRS enabled mobile telephone network connected to the packet-switched network which can be utilised to access the server 105. In such an embodiment, the customer input device 102 would include wireless capabilities for transmitting the voice message. The wireless computing devices may include, for example, mobile phones, personal computers having wireless cards and any other mobile communication device which facilitates voice communication functionality. In another embodiment, the present invention may employ an 802.11 based wireless network or some other personal virtual network.

The last element in the system 100 is the secure service provider system 106 which, according to the embodiment described herein, is in the form of an Internet banking server. The secure service provider system 106 comprises a transmitter/receiver in the form of a network card for communicating with the third party system 104, over communication system 108. The secure service provider system 106 may include a business rule setting which instructs the third party system 104 of the appropriate settings for each type of transaction dependent on the determined measure of confidence.

In an alternative embodiment to that described above the impostor process carried out by the analysis module of the third party server 104 may be repeated for different ambient noise conditions. For example, the impostor data set stored in the impostor database may be contaminated with background noise to simulate noisy telephone environments (such as, for example, where a customer is attempting to authenticate themselves using a mobile telephone in a high wind/noise area, etc). These tests may be performed at increasing noise levels to determine the robustness of the third party system 104. During the tests DET curves and EER measurements are generated for each increasing noise level to ensure that the system 104 remains effective at high noise levels. During these tests the FTA count can also be noted with the expectation that as the noise level increases the FTA will also increase to prevent excessive false accepts and rejects in those conditions. Similarly, baseline testing with noise corrupted enrollment data can also be carried out to detect vulnerabilities associated with the enrollment process. Again, based on the analysis the threshold settings and the like could be adjusted such that with increased noise the number of FTE's increase to prevent weak or compromised voiceprints being registered with the third party system 104.

Although in embodiments described in preceding paragraphs the authentication system 104 was in the form of a "third party", or centralised system, it will be understood that the system need not be a third party system but instead may be incorporated into the secure service provider system.

In an alternative embodiment to that described above, the impostor database may comprise voiceprints provided by legitimate persons during enrollment.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A method for configuring a voice authentication system, the method comprising the steps of:
   (a) selecting a voiceprint stored by the voice authentication system, the voiceprint being associated with an enrolled user of the authentication system;
   (b) initiating an impostor testing process comprising comparing the voiceprint against a set of impostor voice samples derived from voice samples provided by at least one other user enrolled with the authentication system to generate respective authentication scores, the comparison being carried out by at least one authentication engine of the voice authentication system;
   (c) repeating steps (a) and (b) for at least one other voiceprint stored by the authentication system;
   (d) analysing the authentication scores to determine a measure of confidence for the voice authentication system; and
   (e) setting one or more authentication thresholds for the authentication system based on the determined measure of confidence.

2. A method in accordance with claim 1, wherein step (a) further comprises generating additional authentication scores by comparing the stored voiceprint against one or more legitimate voice samples provided by the enrolled user associated with the voiceprint.

3. A method in accordance with claim 2, further comprising plotting the resultant authentication scores on a graph and determining the measure of confidence based on at least one of the grouping and location of scores within the graph.

4. A method in accordance with claim 3, wherein the grouping and/or location between the scores resulting from the impostor testing and legitimate sample testing are analysed to determine the measure of confidence.

5. A method in accordance with claim 3, wherein the plot comprises "m"×"n" dimensions, where "m" represents the number of authentication engines and "n" represents a number of different types of impostor sample being compared.

6. A method in accordance with claim 1, further comprising assigning one or more different thresholds to transactions having varying security requirements.

7. A method in accordance with claim 1, wherein the set of impostor voice samples includes at least one voice samples having a different content type to the voice sample from which the stored voiceprint was derived.

8. A method in accordance with claim 1, wherein at least one impostor voice sample comprises segmented speech elements from two or more voice samples which are ordered in such a way so as to provide the same content spoken in the voice samples from which the stored voiceprint was derived.

9. A method in accordance with claim 1, wherein the impostor voice samples are generated from samples provided by the one or more other users during enrolment with the system.

10. A method in accordance with claim 1, wherein the impostor voice samples are voice samples used to successfully authenticate the corresponding users with the authentication system.

11. A method in accordance with claim 1, wherein the voice sample from which the legitimate voiceprint was derived and the impostor voice samples share a common speaker characteristic.

12. A method in accordance with claim 11, wherein the common speaker characteristic is gender.

13. A non-transitory computer readable medium storing a computer program comprising at least one instruction for controlling a computing system to implement the method in accordance with claim 1.

14. A method for configuring a voice authentication system, the method comprising the steps of:
  (a) selecting a voiceprint stored by the voice authentication system, the voiceprint being associated with an enrolled user of the authentication system;
  (b) utilising an authentication engine implemented by the authentication system to compare the selected voiceprint against a set of impostor samples derived from voice samples provided by at least one other enrolled user of the voice authentication system to generate respective authentication scores;
  (c) repeating step (b) using at least one other authentication engine implemented by the authentication system; and
  (d) determining which authentication engine to utilise for subsequent authentication of the enrolled users based on the resultant scores for each engine.

15. A method in accordance with claim 14, wherein the imposter voice samples have the same content type to the sample(s) from which the enrolled user voiceprint was derived.

16. A method in accordance with claim 15, wherein at least one impostor sample is derived from a voice sample having a different content type to the sample(s) from which the enrolled user voiceprint was derived.

17. A system for configuring a voice authentication system comprising:
  at least one authentication engine operable to:
    (a) receive a voiceprint stored by the voice authentication system, the voiceprint being associated with an enrolled user thereof;
    (b) implement an impostor testing process comprising comparing the selected voiceprint against a set of impostor voice samples derived from voice samples provided by at least one other user enrolled with the authentication system to generate respective authentication scores;
    (c) repeat steps (a) and (b) for at least one other voiceprint stored by the system; and
  an analysis module operable to analyse the resultant scores to determine a measure of confidence for the system and to set one or more authentication thresholds for the authentication system based on the determined measure of confidence, wherein the system comprises a plurality of authentication engines and wherein the measure is determined based on the resultant scores output from each of the plurality of authentication engines.

18. A system in accordance with claim 17, wherein the at least one authentication engine is further arranged to derive additional authentication scores for each voiceprint by comparing the corresponding voiceprint against one or more voice samples provided by the user to which the voiceprint belongs.

19. A system in accordance with claim 17, further comprising setting different authentication thresholds to transactions having varying security requirements.

20. A system in accordance with claim 18, wherein the analysis module is arranged to plot the resultant authentication scores on a graph and determine the measure of confidence based on at least one of the grouping and location of resultant scores within the graph.

21. A system in accordance with claim 20, wherein the grouping and/or location between the scores resulting from the impostor testing and legitimate sample testing are analysed to determine the measure of confidence.

22. A system in accordance with claim 20, wherein the graph comprises "m"×"n" dimensions, where "m" represents the number of authentication engines and "n" represents a number of different impostor sample content types used for comparison.

23. A system in accordance with claim 17, wherein at least one of the impostor voice samples comprises segmented speech elements from different voice samples which are ordered in such a way so as to provide the same content spoken in the voice sample(s) from which the voiceprint was derived.

24. A system in accordance with claim 23, wherein the system further comprises a speech recognition module arranged to re-order the samples to produce the impostor samples.

* * * * *